US008536298B2

(12) United States Patent
Angermeier et al.

(10) Patent No.: US 8,536,298 B2
(45) Date of Patent: Sep. 17, 2013

(54) PRECIPITATIVE PROCESS TO PREPARE POLYIMIDES

(75) Inventors: Philip L. Angermeier, Mount Vernon, IN (US); Robert Edgar Colborn, Niskayuna, NY (US); Robert R. Gallucci, Mt. Vernon, IN (US); Paul Edward Howson, Latham, NY (US); Tara Jane Mullen, Mt. Vernon, IN (US); Roy Ray Odle, Mt. Vernon, IN (US); Albert Santo Stella, Voorheesville, NY (US); John Morgan Whitney, Niskayuna, NY (US)

(73) Assignee: SABIC Innovative Platics IP B.V. (NL)

( * ) Notice: Subject to any disclaimer, the term of this patent is extended or adjusted under 35 U.S.C. 154(b) by 1139 days.

(21) Appl. No.: 11/137,082

(22) Filed: May 25, 2005

(65) Prior Publication Data
US 2006/0270825 A1 Nov. 30, 2006

(51) Int. Cl.
*C08G 73/10* (2006.01)

(52) U.S. Cl.
USPC ........... 528/170; 528/172; 528/173; 528/183; 528/185; 528/310

(58) Field of Classification Search
USPC ............... 528/351, 170, 172, 173, 183, 185, 528/310
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,271,367 A | 9/1966 | Schnell et al. | |
| 3,271,368 A | 9/1966 | Goldberg et al. | |
| 4,794,157 A | 12/1988 | Berdahl et al. | 528/208 |
| 4,835,249 A | 5/1989 | Gallagher et al. | 528/353 |
| 4,874,835 A | 10/1989 | Berdahl et al. | |
| 4,965,337 A | 10/1990 | Peters et al. | 528/353 |
| 4,994,544 A * | 2/1991 | Nagahiro et al. | 528/125 |
| 5,004,800 A * | 4/1991 | Terauchi et al. | 528/351 |
| 5,189,137 A | 2/1993 | Howson et al. | 528/171 |
| 5,703,199 A * | 12/1997 | Henze et al. | 528/329.1 |
| 6,451,955 B1 | 9/2002 | Hausladen et al. | 528/170 |
| 6,713,597 B2 * | 3/2004 | Lindway | 528/353 |
| 6,780,960 B2 * | 8/2004 | Hausladen et al. | 528/170 |
| 2001/0043783 A1 | 11/2001 | Sotokawa et al. | 385/131 |
| 2003/0158370 A1* | 8/2003 | Kuroki et al. | 528/170 |
| 2005/0079216 A1 | 4/2005 | Petereit et al. | 424/464 |
| 2006/0194070 A1* | 8/2006 | Croll et al. | 428/473.5 |

FOREIGN PATENT DOCUMENTS

| | | |
|---|---|---|
| EP | 0274121 | 7/1988 |
| WO | WO 88/09353 | 12/1988 |
| WO | WO 02/085605 | 10/2002 |

OTHER PUBLICATIONS

Uhara Kenji " Polyimide film, method for producing the same and metallic wiring board using the same as base." JPO Publication No. 204-027213.*
Kim; "Kinetic and Mechanistic Investigations of the Formation of Polyimides Under Homogeneous Conditions"; American Chemical Society 1993; Macromolecules 1993; vol. 26; 1344-1358.
Kreuz; "Studies of Thermal Cyclizations of Polyamic Acids and Tertiary Amine Salts"; Journal of Polymer Science 1996: Part A-1; vol. 4; 2607-2616.
Chao; "A 31P NMR Study of Poly(phenylene oxide) (PPO)(1) Resin's Hydroxyl End Groups"; Polymer Bulletin; Springer-Verlag 1987; vol. 17; 397-401.
Chan; "Facile Quantitative Analysis of Hydroxyl End Croups of Poly(2,6-dimethyl-1,4-phenylene oxide)s by 31P NMR Spectroscopy"; Macromolecules 1994; vol. 27; 6371-6375.
JP2001235641; Publication Date: Aug. 31, 2001; Abstract.

* cited by examiner

Primary Examiner — Gregory Listvoyb
(74) Attorney, Agent, or Firm — Cantor Colburn LLP

(57) ABSTRACT

A process for preparing polyimide resins comprises stirring a diamine and a dianhydride in a solvent to form a slurry; heating the slurry to a temperature sufficient for the diamine and dianhydride to react wherein the temperature is below the melting point of the dianhydride, below the melting point of the diamine, or below the melting points of the dianhydride and diamine; and reacting the diamine and dianhydride to form a polyimide having sufficient molecular weight to precipitate from the solvent.

33 Claims, No Drawings

PRECIPITATIVE PROCESS TO PREPARE POLYIMIDES

BACKGROUND OF THE INVENTION

Disclosed herein is a process for the formation of polyimide resins.

A standard method to make polyimides is to employ a highly polar solvent that dissolves both the monomers and resultant polymers. Solvents such as dimethyl formamide (DMF), dimethyl acetamide (DMAC), N-methyl pyrrolidinone (NMP), hexamethyl phosphoramide (HMPA) and dimethyl sulfoxide (DMSO) are widely used in this regard. The resultant polymer is totally dissolved and can be isolated from solution by removal of solvent as part of a film casting or other evaporative process or by precipitation using an anti-solvent such as methanol.

A less widely known technique to make polyimides is described in U.S. Pat. No. 4,835,249 in which the reactants are dissolved in a solvent and then polymerized to an extent where the polymer precipitates from solution and can eventually be isolated by filtration or other related separation technique.

The aforementioned methods, while useful in some circumstances, are not universally applicable to all monomer combinations. Accordingly, there remains a need for methods of forming polyimide resins which are useful with a wider range of monomer combinations.

BRIEF DESCRIPTION OF THE INVENTION

A process for preparing a polyimide resin comprises:
stirring a diamine and a dianhydride in a solvent to form a slurry;
heating the slurry to a temperature sufficient for the diamine and dianhydride to react wherein the temperature is below the melting point of the dianhydride, below the melting point of the diamine, or below the melting points of the dianhydride and diamine; and
reacting the diamine and dianhydride to form a polyimide having sufficient molecular weight to precipitate from the solvent.

DETAILED DESCRIPTION OF THE INVENTION

We have found that the use of the precipitation process has certain drawbacks when one or more of the monomers used to make the polyimide are themselves minimally soluble in the reaction medium. A common approach to improve solubility is to increase the temperature of the mixture. If the reaction temperature is raised above the melting point of the minimally soluble reactant(s) the minimally soluble reactant(s) may melt, forming a separate oily phase. The oily phase, when present in sufficient quantity, causes aggregation of the precipitating polymer, resulting in large aggregates, typically having a size greater than or equal to 1 centimeter (cm), which either significantly decrease stirring efficiency or cannot be stirred. These aggregates contain precipitated polymer and unreacted monomer, the separation of which is difficult or impossible. The non uniformity of the reaction mixture and the reduced mobility of the entrained monomer also may make it difficult to control the polymerization and achieve the desired molecular weight, end group concentration, or both molecular weight and end group concentration.

An important feature of the precipitative polymerization process is that as the polymer precipitates it does so in a way that maintains a uniform, non-sticky precipitate, or slurry, that can be stirred. We have found a surprising temperature dependence in the process for making a polyimide by the precipitative process when using monomers that are not fully dissolved in the reaction medium during the start of the reaction.

Independent of the exact mechanism of action it has been found that if the reaction temperature is kept below the melting point of the minimally soluble monomer(s), the polymer precipitates as a fine powder that is easily stirred. The easily stirred solid/solvent mixture is herein called a slurry or a uniform liquid-solid or uniform solid-liquid mixture. The slurry is easily stirred with conventional stirred tank agitation systems, for instance blade and paddle stirrer systems, turbine or propeller mixers with various blade configurations. In some embodiments combinations of stirrer types may be used. In some embodiments, stirrers may be used in reactors that contain baffles to help mixing. Any suitable stirred reactor may be used to prepare and polymerize the slurry. The liquid portion of the slurry may be referred to as the reaction solvent within the specification, even though it does not completely dissolve all the reactants or the resultant polymers.

In some embodiments, when sufficient monomer has been consumed in the polymerization to prevent agglomeration of the polyimide (and optionally monomer(s)), for instance greater than or equal to about 50 mole %, the temperature of the slurry may be increased above the melting point temperature of the minimally soluble monomer(s) to drive the imidization reaction to completion if so desired. In some embodiments it may be a desirable to have higher incorporation of the minimally soluble monomer(s) into the polymer, such as greater than or equal to about 75 mole %, or, more specifically, greater than or equal to about 95 mole %, or, even more specifically, 100 mole % incorporation, before raising the temperature above the melting point of the minimally soluble monomer(s).

It can also be useful to remove water, or other volatile by-products from the reaction mixture by distillation or other means. In one embodiment azeotropic distillation of water is employed. In some embodiments water can be removed by chemical absorption using, for example, molecular sieves. In other instances water can be removed using a stream of a gas, for example nitrogen, passing over or through the reaction mixture. In addition, a combination of two or more water removal methods may be employed.

In one embodiment, the polymerization is conducted entirely below the melting point of the minimally soluble monomer(s). This may be useful when the boiling point temperature of the solvent and the melting point of the minimally soluble monomer(s) are greater than about 100° C., to allow removal of water from the polymerization reaction at atmospheric pressure.

It can be useful to conduct the polymerization under pressure, for example about 1 to about 300 pounds per square inch (psi) (21.1 kilograms force per square centimeter ($kgf/cm^2$)), or, more specifically, about 1 psi (0.070 $kgf/cm^2$) to about 100 psi (7.0 $kgf/cm^2$). This can be done for a variety of reasons, one being to raise reaction temperature and increase the rate of imidization. In order to prevent sticking or clumping of the precipitated polymer it is still important to maintain temperature below the melting point of the minimally soluble monomer(s) even when pressure is increased. In some embodiments, it may be useful to remove water from the reaction while pressure is maintained at atmospheric pressure. In some embodiments it can be useful to remove water in a multi step process employing pressures greater than or equal to atmospheric pressure.

After the consumption of greater than or equal to about 50 weight percent (wt %) of the initial charge of the monomers it can be useful in some embodiments to isolate the precipitated polymer. In other embodiments the precipitated polymer may be isolated when greater than or equal to about 90 wt % of the initial charge of monomers are consumed. This can be done using a variety of methods, for example, filtration, centrifugation, floatation, spray drying, solvent evaporation, solvent distillation, freeze-drying, and combinations comprising one or more of the foregoing methods. In some embodiments filtration, spray drying, solvent evaporation, or distillation or a combination of two or more of the foregoing methods maybe employed. In other embodiments an extrusion devolatilization process can be used to isolate the polyimide from the slurry. In some embodiments greater than or equal to about 95 wt % of the isolated precipitated polyimide, based on the total weight of the isolated precipitated polyimide, passes through a 2 millimeter (mm) mesh screen. In some embodiments the isolated precipitated polyimide is a free flowing powder with an average particle size of about 10 to about 5000 micrometers. Regardless of the isolation method low levels of solvent generally remain in the polyimide, typically on the order of parts per million or on the order of parts per million.

It can be useful to recover the solvent after separation of the polymer. The solvent can be reused in subsequent polymerization reactions. In some embodiments it can be reused without purification.

The solvent used to form the slurry is chosen such that one or more of the initial monomers is minimally soluble. Minimally soluble is defined as about 1 to about 50 wt % of the monomer is undissolved at the start of the reaction (at the initial reaction conditions). In addition the solvent should be chosen such that the resultant polymer is largely insoluble, that is to have a polymer solubility of less than or equal to about 10 wt %, or, even more specifically, less than or equal to about 5 wt %, or, even more specifically, less than or equal to about 1 wt %. In some embodiments the solvent comprises an aprotic polar solvent. In some embodiments, the solvent is insoluble in water, that is less than or equal to about 5 wt %, or, more specifically, less than or equal to about 1 wt %, based on the total amount of solvent, of the solvent dissolves in an equal amount of water at room temperature. In some embodiments, the solvent has a high auto ignition temperature, for example greater than or equal to about 70° C., to reduce the potential fire hazard during the process and during any subsequent isolation.

In addition a solvent free of nitrogen atoms, phosphorus atoms, sulfur atoms or a combination comprising two or more of the foregoing may be useful in some embodiments. Solvents without these more polar atoms may be easier to remove from the polymer and being less effective solvents are more likely to have monomers and polymers that are minimally soluble or insoluble.

Examples of useful solvents include halogenated aromatics, such as chloro benzene, dichlorobenzene, trichlorobenzene and bromobenzene; aryl ethers such as phenetole, anisole and veratrole; alky\aromatics such as xylenes and toluene; nitro aromatics such as nitrobenzene; polyaryl species such as naphthylene and alkyl substituted fused aromatic systems; aryl sulfone; high molecular weight alkane compounds such as mineral oils; and combinations comprising one or more of the foregoing solvents. In some embodiments the solvent or combination of solvents has an atmospheric boiling point of 150 to 250° C.

The reaction may be run at any level of reactants versus solvent. In some instances the % solids can be about 5 to about 50% by weight of reactants to solvent at the start of the polymerization reaction. In other instances concentrations from 15-40% may be useful. In still other instances higher concentrations of reactants to solvent may be used to gain reactor efficiency.

The polymerization process employs the reaction of a dianhydride (or chemical equivalent of a dianhydride) with a diamine. The diamine, dianhydride or both are minimally soluble in the reaction medium. Examples of dianhydrides are shown in formula (I):

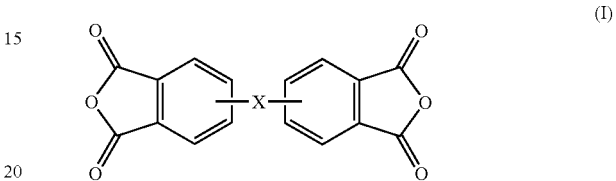

wherein X is —O—, —S—, —SO$_2$—, —(C=O)—, —Ar—, —O—Ar'—O— or —S—Ar"—S—. Ar, Ar' and Ar" represent aryl or polyaryl functionality independently selected from substituted and unsubstituted divalent aromatic radicals having 6 to 36 carbons. In one embodiment X comprises a —O—, —S—, —SO$_2$—, —Ar—, —O—Ar'—O— or —S—Ar"—S linkage wherein the divalent bonds of said group are in the 3,3', 3,4', 4,3', or the 4,4' positions, and wherein Ar, Ar' and Ar" include, but are not limite, to divalent radicals of formula (II):

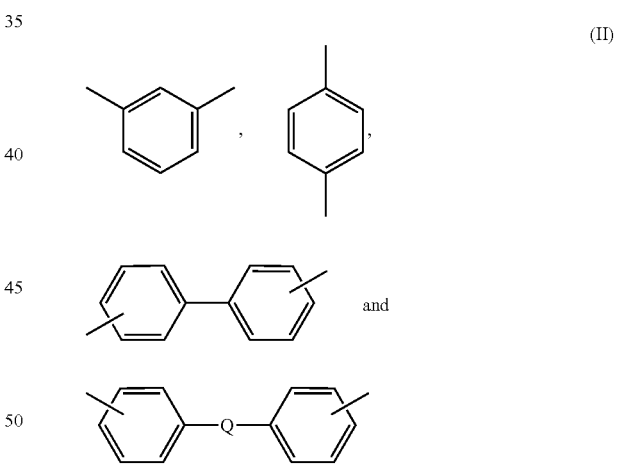

wherein Q includes but is not limited to a divalent moiety selected from the group consisting of —O—, —S—, —(C=O)—, —SO$_2$—, C$_y$H$_{2y}$— (y being an integer from 1 to 10), and halogenated derivatives thereof, including perfluoroalkylene groups.

X in formula (I) also includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III):

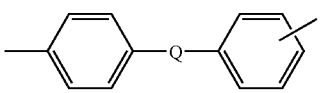

(III)

wherein Q includes, but is not limited to a divalent moiety selected from the group consisting of —O—, —S—, —(C=O)—, —SO$_2$—, C$_y$H$_{2y}$— (y being an integer from 1 to 10), and halogenated derivatives thereof, including perfluoroalkylene groups.

Examples of the moiety "X" also include those derived from the dihydroxy-substituted aromatic hydrocarbons of the formula (IV):

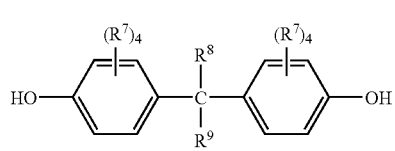

(IV)

where each R$^7$ is independently hydrogen, chlorine, bromine, or a C$_{1-30}$ monovalent hydrocarbon or hydrocarbonoxy group, and R$^8$ and R$^9$ are independently hydrogen or a C$_{1-30}$ hydrocarbon group.

In various embodiments the moiety "X" may be derived from dihydroxy-substituted aromatic hydrocarbons disclosed by name or formula (generic or specific) in U.S. Pat. Nos. 2,991,273, 2,999,835, 3,028,365, 3,148,172, 3,271,367, and 3,271,368. In some embodiments such dihydroxy-substituted aromatic hydrocarbons include bis(4-hydroxyphenyl)sulfide, 1,4-dihydroxybenzene, 4,4'-oxydiphenol, 2,2-bis(4-hydroxyphenyl)hexafluoropropane, and mixtures comprising one or more of the foregoing dihydroxy-substituted aromatic hydrocarbons. In other embodiments, such dihydroxy-substituted aromatic hydrocarbons include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis (2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; resorcinol; C$_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide. In some cases mixtures of two or more of these dianhydrides may be used to prepare the polyimide.

Illustrative, non-limiting examples of aromatic dianhydrides for synthesis of thermoplastic polyimides comprise 4,4'-oxydiphthalic anhydride, 3,4'-oxydiphthalic anhydride, 3,3'-oxydiphthalic anhydride, sulfur diphthalic anhydride, benzophenone dianhydride, sulfone diphthalic anhydride, bisphenol A diphthalic anhydride, biphenol diphthalic anhydride, resorcinol diphthalic anhydride, hydroquinone diphthalic anhydride, diphenyl sulfone tetracarboxylic dianhydride, diphenyl sulfide tetracarboxylic dianhydride, 2,2-bis (4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy) diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride, 4-(2,3-dicarboxyphenoxy)-4'-(3,4-dicarboxyphenoxy)diphenyl sulfone dianhydride, pyromellitic dianhydride and biphenylene dianhydride, as well as mixtures comprising one or more of the foregoing dianhydrides.

The polyimide may contain, for example, imide linkages derived from 4,4'-bisphthalic anhydride structural units of formula (V):

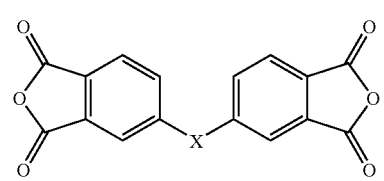

(V)

where X is as defined above.

The term dianhydride, as used herein, is understood to include chemical equivalents of dianhydrides that can react with diamines to form imide linkages. Such dianhydride chemical equivalent include, for example, tetra carboxylic acids, tetra carboxylic esters, carboxylic acid esters, carboxylic anhydride esters, carboxylic anhydride acids, or mixtures thereof capable of forming imide linkages by reaction with diamines. Illustrative, non limiting examples of a derivatized anhydride group which can function as a chemical equivalent for the dianhydride in imide forming reactions, include dianhydride derivatives of the formula (VI):

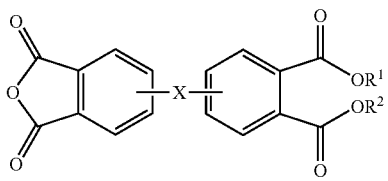

(VI)

wherein R¹ and R² of formula (VI) can be, independently, any of the following: hydrogen; an alkyl group; an aryl group. R¹ and R² can be the same or different to produce an anhydride acid, an anhydride ester, or an anhydride acid ester.

Additional examples of anhydride functional equivalents may include dianhydride derivatives which have two derivatized anhydride groups, such as for example, where the dianhydride derivative is of the formula (VII):

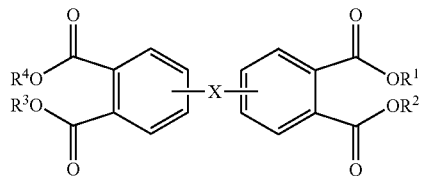

(VII)

wherein R¹, R², R³ and R⁴ of formula (VII) can be any of the following: hydrogen; an alkyl group, an aryl group. $R_1$, $R_2$, $R_3$, and $R_4$ can be the same or different to produce diacids, diesters, and acid esters.

The polymerization process employs the reaction of a dianhydride with a diamine, at least one of which is minimally soluble in the reaction medium. Examples of diamines are shown in formula (VIII):

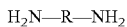 (VIII)

wherein the moiety R in formula (VIII) includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III):

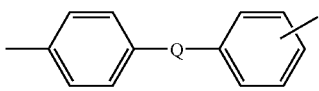

(III)

wherein Q is as defined above.

In other embodiments diamines of formula (IX) may be used where Y is —O—, —S—, —SO₂—, —(C=O)—, —Ar—, —O—Ar'—O— or —S—Ar"—S—. Ar, Ar' and Ar" represent aryl or polyaryl functionality independently selected from substituted and unsubstituted divalent aromatic radicals

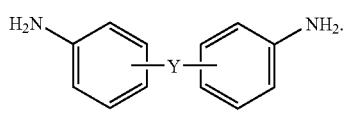

(IX)

In some embodiments suitable organic diamines for synthesis of thermoplastic polyimides comprise aromatic diamines, illustrative examples of which include, but are not limited to, 4,4'-diaminodiphenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,3-bis(3-aminophenoxy)benzene, 1,3-bis(4-aminophenoxy)benzene, 1,4-bis(4-aminophenoxybenzene), 3,3'-diaminodiphenylsulfone, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, 3,3'-diaminobenzophenone, 4,4'-diaminodiphenylmethane, 4,4'-diaminodiphenyl ether, 3,3'-diaminodiphenylmethane, benzidine, 3,3'-dimethylbenzidine, 3,3'-dimethoxybenzidine, 4,4'-diaminodiphenylsulfide, 2,2'-bis(4-aminophenyl)propane; bis(p-beta-methyl-o-aminophenyl)benzene; 1,3-diamino-4-isopropylbenzene; 1,2-bis(3-aminopropoxy)ethane; diamino benzanilide, aminophenoxy biphenyl, bis aminophenoxy sulfone, bis aminophenoxy benzene, bis(p-beta-amino-t-butylphenyl)ether; 1,5-diaminonaphthalene; 2,4-bis(beta-amino-t-butyl)toluene; bis aminophenoxy fluorene, 9,9-bis(4-aminophenyl) fluorenone and m-xylenediamine. Mixtures comprising one ore more of the foregoing diamines can also be used. In some embodiments the diamine compounds are aromatic primary diamines free of benzylic hydrogens. Exemplary diamines free of benzylic hydrogens include m- and p-phenylenediamine, diamino diphenyl sulfone and mixtures comprising one or more of the foregoing.

In another embodiment, the diamine, as described above, has at least one sulfone linkage, for example as shown in aryl diamino sulfones of the formula (X):

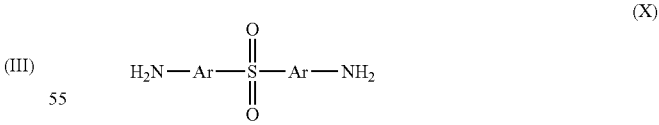

(X)

wherein Ar is defined as above. The aryl rings may also be fused. Several aryl rings may be linked together, for example through ether and or sulfone linkages. Aromatic diamino sulfones include, but are not limited to, for example, diamino diphenyl sulfone (DDS) and bis(aminophenoxy phenyl) sulfones (BAPS).

In one embodiment, the amine groups of the aryl diamino sulfone can be meta or para to the sulfone linkage, for example, as in formula (XI):

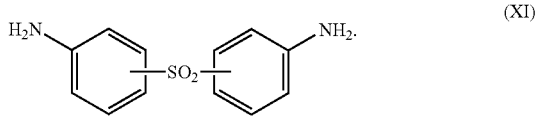

(XI)

The polyimide resins in one embodiment comprise more than 1, typically about 10 to about 1000 or more, or, more specifically, about 30 to about 500 structural units of formula (XII).

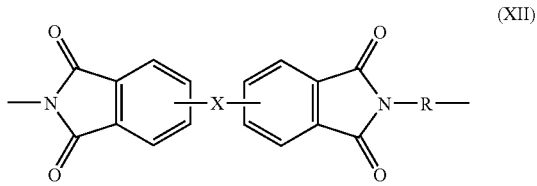

(XII)

wherein X and R are defined as above.

Polyimides may contain imide linkages derived by reaction of any one or more of the dianhydrides, or chemical equivalents, of formulas (I), (V), (VI) or (VII) with one or more of any of the diamines of formulas (VIII), (IX), (X) or (XI). In some cases the polyimide will be a polyetherimde. In other cases it will be a polyetherimide sulfone.

The polyimides may also include polyimide copolymers which include structural units derived from imidization reactions of mixtures of the dianhydrides listed above having two, three, or more different dianhydrides, and a more or less equal molar amount of an organic diamine, or mixture of diamines, are also contemplated. In addition, copolymers that have greater than or equal to about 50 mole % imide linkages derived from oxy diphthalic anhydrides, which includes derivatives thereof, and up to about 50 mole % of alternative dianhydrides chemically distinct from oxy diphthalic anhydride are also contemplated. In other embodiments copolymers that have greater than or equal to about 50 mole % imide linkages derived from diamino aryl sulfones are contemplated.

In some embodiments the polyimide made by precipitative polymerization may contain amide acid, or other functionality, that has not been converted to imide linkages. Such polymers are included in the term polyimide used herein such that greater than or equal to 50 mole % of the polymer linkages contain imide groups. In other embodiments the polyimide has greater than or equal to about 75 mole % imide linkages based on the total number of linkages in the polymer derived from reaction of a diamine with a dianhydride. In still other embodiments the polyimide will have greater than or equal to about 95 mole % imide linkages.

Polyimides may be made using the precipitative process by reaction of more or less equal molar amounts of dianhydride (or chemical equivalent of a dianhydride) with a diamine. In some embodiments the amount of dianhydride and diamine differ by less than about 5 mole %; this helps to give polymers of sufficient molecular weight (Mw), for example greater than or equal to about 5,000 g/mol, to precipitate from the reaction medium and have useful mechanical properties such as stiffiess, impact strength and resistance to tearing or cracking.

In some embodiments, where melt process ability is desired, both the diamine and the dianhydride comprise one or more flexible linkages chosen from functional groups such as, aryl ether, aryl sulfide, aryl sulfone, diaryl alkylidene or similar functionality wherein the linkage allows some degree of molecular rotation.

A chain-terminating agent may be employed to control the molecular weight of the final polymer product. The chain terminating agent may be partially or totally soluble in the starting reaction mixture. Mono-amines such as anilinemono-anhydrides such as phthalic anhydride, or combinations of mono-amines and mono-anhydrides may be employed. The amount of monoamine, mono-anhydride or mixture thereof, may be any amount that provides the desired molecular weight of the polyimide. In some embodiments the amount of mono-amine, mono-anhydride or combination thereof may be about 0.1 to about 15.0 mole %, or 0.1 to 5.0 mole %, based on the total monomer content.

Mono-amines that can be used to end cap the polyimide may have from about 3 to about 24 carbon atoms, may be aliphatic or aromatic, and may include, but are not limited to, substituted or unsubstituted anilines, substituted or unsubstituted naphthyl amines and substituted or unsubstituted heteroaryl amines. The mono-amines may have additional functionality, for instance, aryl groups, alkyl groups, aryl-alky groups, sulfone groups, ester groups, amide groups, halogens, alkyl or aryl halogen groups, alkyl ether groups, aryl ether groups, or aryl keto groups. Some particular substituents on mono-amines include, but are not limited to, halo and perfluoroalkyl. The attached functionality should not impede the function of the mono-amine in controlling polyimide molecular weight.

Mono-anhydrides may also have about 3 to about 24 carbon atoms, may be aliphatic or aromatic, and include, but are not limited to, substituted or unsubstituted phthalic anhydrides for instance, phthalic anhydride, chloro phthalic anhydride, methoxy phthalic anhydride, phenoxy phthalic anhydride, naphthyl anhydrides and the like. End capping agents may also be chosen from the group consisting of 1,2-dicarboxylic acids, 1,2-dicarboxylic esters, 1,2-dicarboxylic ester acids and mixtures comprising one or more of the foregoing.

Branching agents may also be employed in the reaction to prepare branched polyimides, branched polyetherimides or branched polyetherimide sulfones. Exemplary branching agents include, for example, tri or tetra functional amines or anhydrides.

The polyimide resin can have a weight average molecular weight (Mw) of about 5,000 to about 100,000 grams per mole (g/mole) as measured by gel permeation chromatography (GPC). In some embodiments the Mw can be about 10,000 to about 80,000. The polydispersity of polyimides made by this process can be about 2.0 to about 3.0 or higher. Polyimide resins may have an intrinsic viscosity greater than or equal to about 0.2 deciliters per gram (dl/g) as measured in m-cresol at 25° C. Within this range the intrinsic viscosity may be about 0.35 to about 1.0 dl/g, as measured in m-cresol at 25° C. In some embodiments the polyimide has a glass transition temperature (Tg) of about 250° C. to about 350° C. as measured using differential scanning calorimetry (DSC) as per ASTM test D3418. In some embodiments the polyimide has a glass transition temperature (Tg) of about 270 to about 315° C.

As mentioned above, when melt processability is desired, polyimides with at least two flexible groups in the polymer backbone may be employed. Some melt processable polyimides will have at least two flexible linkages in each polymer repeat unit. Examples of such flexible linkages are aryl ether groups, aryl sulfone groups, aryl sulfide, diaryl alkylidene linkages and the like. In cases where the polyimide is melt processable it may be useful to have a melt viscosity, as measured by ASTM method D3835, of about 500 to about 10,000 Pascal-seconds (Pa-s) at 350 to 425° C.

In one embodiment the polyimide is substantially or essentially free of linkages derived from pyromellitic dianhydride (PMDA). Substantially free of PMDA is defined as having less than about 5 mole % of structural units, or, more specifically, less than about 3 mole % structural units, or, even more specifically, less than about 1 mole % structural units derived from pyromellitic dianhydride. Free of pyromellitic dianhydride means that the polyimide has zero mole % of structural units derived from pyromellitic dianhydride. Polyimides essentially free of PMDA derived linkages may have improved melt processability due to the absence of the rigid inflexible imide linkages formed by incorporation of the PMDA in the polymer structure.

In one embodiment, the polymer is free or substantially free of linkages that can react in the melt to change the molecular weight of the polymer. The presence of benzylic protons in the polyimide typically accelerates reactions that change molecular weight in the melt. Due to the increased melt stability of the resultant polymer, polyimides with structural units derived from aromatic diamines, aromatic dianhydrides and capping agents essentially free of benzylic protons are desirable in some applications, especially those involving isolation from the melt and melt processing after polymerization. As used herein substantially or essentially free of benzylic protons means that the polyimide product has less than or equal to about 5 mole % of structural units, or, more specifically, less than or equal to about 3 mole % structural units, or, even more specifically, less than or equal to about 1 mole % structural units derived containing benzylic protons. Free of benzylic protons means that the polyimide film has zero mole % of structural units derived from monomers and end cappers containing benzylic protons. The amount of benzylic protons can be determined by ordinary chemical analysis.

In one embodiment the polyimide is essentially free of halogen atoms. Essentially free of halogen atoms means that the polyetherimide has less than or equal to about 5 mole % of structural units, or, more specifically, less than or equal to about 3 mole % structural units, or, even more specifically, less than or equal to about 1 mole % structural units derived from compounds containing halogen atoms. The amount of halogen atoms can be determined by ordinary chemical analysis. Polymers free of halogen atoms are sometimes desired for regulatory and environmental reasons.

Polyimide resins may have varying levels of amine and anhydride end groups depending on the amounts of diamine and dianhydride used in the polymerization reaction and the degree of completeness of the polymerization reaction. A variety of amine, anhydride, and anhydride derivatives such as carboxylic acids, carboxylate salts, amide-acids and amide-carboxylate salts are examples of possible end groups. As used herein it will be understood that the term "amine end groups" comprises end groups that are amines, and any related end groups that are derived from amine end groups. As used herein it will also be understood that the term "anhydride end groups" comprises end groups which are anhydrides and anhydride derivatives such as carboxylic acid, carboxylate salts, amide-acids and amide-carboxylate salts. All types, more than one type or essentially one type of these end groups may be present. As used herein the term "reactive end group" refers to any of the various possible end groups that can give rise to volatile species during melt processing Most reactive end groups will be amine or anhydride. In general total reactive end group concentrations can be about 1 to about 100 milliequivalents/kilogram (meq/kg) resin. In one embodiment the polyimide has a total amine and anhydride end group concentration of less than about 100 milliequivalents/kilogram resin. In many embodiments at least one aromatic dicarboxylic acid anhydride or at least one primary monoamine is used to control polyimide molecular weight. In these cases amine and anhydride end groups will be lower, typically 10 to 75 meq/kg resin, sometimes less than about 50 meq/kg or lower. Control of amine, carboxylic acid and carboxylic anhydride end groups may be desirable to improve the melt stability of polyimides by reducing changes in melt viscosity at melt processing temperatures.

The concentration of amine, anhydride and related end groups can be analyzed by various titration and spectroscopic methods well known in the art. Spectroscopic methods include, infrared, nuclear magnetic resonance, Raman spectroscopy, and fluorescence. Examples of infrared methods are described in J. A. Kreuz, et al., and J. Poly. Sci. Part A-1, vol. 4, pp. 2067-2616 (1966). Examples of titration methods are described in Y. J. Kim, et al., Macromolecules, vol. 26, pp. 1344-1358 (1993). It may be advantageous to make derivatives of polymer end groups to enhance measurement sensitivity using, for example, variations of methods as described in K. P. Chan et al., Macromolecules, vol. 27, p. 6731 (1994) and J. S. Chao, Polymer Bull., vol. 17, p. 397 (1987).

In some embodiments where the polyimide is used in demanding applications, for example sensitive electronic or electronic devices, or in the preparation of semiconductor chips, it is desirable to have low levels of metal ions, more specifically alkaline and alkaline earth cations. In some embodiments such cations are present in the polyimide in an amount less than or equal to about 100 parts per million (ppm) based on the total weight of the polyimide.

It is often useful to melt process the isolated polyimide powder into shaped articles, such as pellets, profiles, fibers, films, tubes or wire coatings. Additionally the isolated polyimide powder may be cold compressed into a variety of articles such as pellets and sheets. The polyimide may also be melt filtered in the course of, or subsequent to, melt processing. The polyimide resins may be melt filtered using known melt filtering techniques to remove foreign material, carbonized particles, crosslinked resin or similar impurities. Melt filtering can occur during initial resin melt processing, as part of solvent removal by an extrusion devolatilization step or in any subsequent step. In general melt filtering includes using a filter with pore size sufficient to remove particles with a dimension of greater than or equal to about 100 micrometers. In other embodiments finer melt filters are useful, in some cases excluding particles of about 10 to 50 micrometers or smaller.

The polyimides made by the process described herein may be formed into shaped articles by a variety of common processes for shaping polymers such as injection molding, compression molding, sintering, extrusion molding and gas assist injection molding. Examples of such articles include, but are not limited to, electrical connectors, enclosures for electrical equipment, automotive engine parts, lighting sockets and reflectors, electric motor parts, power distribution equipment, communication equipment and the like including devices that have molded-in snap fit connectors. The polyimide resins can also be made into films and sheets. The polyimides can also be used to form coatings.

Other applications for the polyimides and films comprising polyimides include, but are not limited to, insulation, for example cable insulation and wire wrapping; construction of motors; electronic circuits, for example flexible printed circuits; transformers; capacitors; coils; switches; separation membranes; computers; electronic and communication devices; telephones; headphones; speakers; recording and play back devices; lighting devices; printers; compressors; and the like.

In some instances it is desirable to coat the shaped article, or a portion of the article, with a metal surface. Such a coating may provide radio and electromagnetic wave shielding or reflectance. It may also provide the article with an electrically conductive pathway or surface. The coating may be of any metal; however, silver, copper, gold, nickel, aluminum, and chrome as well as alloys containing any of the foregoing are often preferred. The articles may have one or several metal coatings combining different metals or mixtures of metals. The metal surface may be applied using techniques well known in the art, for example, by sputtering, vacuum deposition or electroless metallization.

The polyimides can also be combined with other optional ingredients such as mineral fillers, for example, talc, clay, mica, barite, wollastonite, silica, milled glass and glass flake; colorants, for example, titanium dioxide, zinc sulfide, and carbon black; lubricants; processing aids, flame retardants; and ultra violet light stabilizers. The compositions can also be modified with effective amounts of inorganic fillers, such as, for example, carbon fibers and nanotubes, metal fibers, metal powders, conductive carbon, and other additives including nano-scale reinforcements. The polyimides can also be combined with other polymers to form blends and alloys.

It should be clear that thermoplastic compositions made by the process described herein are another embodiment. It should also be clear that articles formed out of the thermoplastic compositions described herein are another embodiment.

The following examples are included to provide additional guidance to those skilled in the art. The examples provided are merely representative are not intended to limit the invention, as defined in the appended claims, in any manner.

EXAMPLES

Comparative Example A 4,4'-Diamino diphenyl sulfone (27.03 grams (g), 0.109 mole, melting point 176° C.), 4,4'-oxydiphthalic anhydride (35.3 g, 0.114 mole melting point 226° C.), aniline (0.93 g, 0.01 mole), and ortho-dichlorobenzene (470 mL) were charged to a three-necked flask equipped with a Dean-stark trap and overhead mechanical stirrer. Upon agitation, a white homogeneous solid-liquid slurry was formed. The reactor was allowed to purge with nitrogen for 10 minutes and placed in an oil bath at room temperature. The setting on the oil bath was raised to about 185° C., after 55 minutes of heating the reaction mixture reached the temperature of about 178° C. The slurry agglomerated, forming a large ball shaped mass and stopping agitation.

Comparative Example B

A three-necked flask equipped with a Dean-stark trap and overhead mechanical stirrer was charged with 4,4'-oxydiphthalic anhydride (ODPA) (61.02 g, 0.197 mole) and ortho-dichlorobenzene (ODCB) (225 mL). The flask was lowered into an oil bath and heated until a temperature of about 175° C. was reached. The ODPA was dissolved. The mixture was then allowed to cool to 160° C.; the ODPA remained dissolved in solution. Aniline (1.475 g, 0.016 mole) was added dropwise and allowed to react at 160° C. for 3 hours. The clear reaction solution was then brought to reflux (185° C.). In a separate flask equipped with a magnetic stirrer, 4,4'-diamino diphenyl sulfone (4,4'-DDS) (46.87 g, 0.189 mole) was combined with ortho-dichlorobenzene (106 mL). Upon agitation a white homogeneous slurry was formed. A 15 mL aliquot of the 4,4'-DDS slurry was drawn off and added to the refluxing ODPA solution. A small ball of insoluble material was observed that finally dissipated into a homogeneous slurry after 30 minutes. Three additional 15 mL aliquots of 4,4'-DDS were added over a period of 90 minutes. After each aliquot, agglomerated particles were observed which slowly dissipated prior to addition of the next aliquot. Upon addition of the fifth aliquot, the entire slurry agglomerated and stirring could no longer be achieved.

Example 1

To a three-necked flask equipped with a Dean-stark trap and overhead mechanical stirrer, 4,4'-oxydiphthalic anhydride (ODPA) (61.87 g, 0.200 mole) and ortho-dichlorobenzene (365 mL) was added. The flask was lowered into an oil bath and heated until a temperature of about 175° C. was reached. The ODPA was dissolved. The reaction was then allowed to cool to 160° C., the ODPA remained dissolved in solution. Aniline (1.425 g, 0.015 mole) was added, and allowed to react at 160° C. for 80 minutes. The reaction was allowed to cool to 120° C. over 30 minutes. 4,4'-Diamino diphenyl sulfone (47.59 g, 0.192 mole) was suspended in ortho-dichlorobenzene (100 mL), and added to stirred ODPA—aniline reaction mixture and allowed to react at 130° C. for 20 minutes. The reaction temperature on the oil bath was then raised slowly to 175° C. in 8° C. intervals over 140 minutes. A white to yellow/white homogeneous slurry was observed throughout the temperature ramp. The slurry was allowed to react for 15 hours. It was then cooled to room temperature and the resulting polymer was isolated via vacuum filtration. The dried powder passed through a 2 mm mesh screen.

Example 2

ODPA (15.18 kg) was charged to a stirred glass lined reactor with 123.65 kilograms (kg) of ODCB with 0.35 kg aniline. The reactor was heated to 180° C. using oil heating and 8 kg of ODCB was removed. The reactor was cooled to about 120° C. and 11.215 kg DDS added with stirring. The oil temperature was raised to 155° C. over 210 minutes, and the slurry temperature reached about 146° C. Water began to evolve; a nitrogen sweep was used to help remove water from the reactor. The oil temperature was raised to 171° C. and held there for 115 minutes. The reaction temperature increased to about 166° C. as water evolved. The slurry was still easily stirred. The oil temperature was raised to 186° C. and the reaction temperature increased to about 177° C. over the next 25 minutes. The DDS incorporation was judged sufficient to further increase the oil temperature to 195° C. giving a reaction slurry temperature of 179° C. Over the next hour 45 kg of condensate was removed. Heat was reduced and the reaction cooled to 50° C. No stickiness of the polymer was observed. The precipitated polyetherimde was removed from solution by centrifugation at about 12° C. using a 5 micrometer centrifuge bag. The polymer was dried at 150° C. in a double cone dryer. The resultant powder passed through a 2 mm sieve.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A process for preparing polyimide resins comprising:
stirring a mixture consisting of a diamine of formula (X):

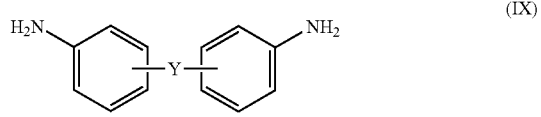

wherein Y is at least one of —O—, —S—, —SO$_2$—, —(C=O)—, -Aryl-, —O-Aryl-O— or —S-Aryl-S—, a dianhydride of formula (I):

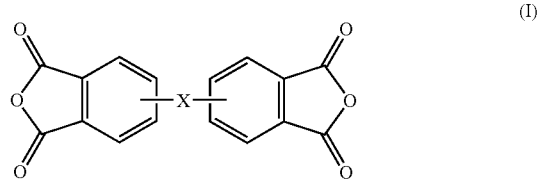

wherein X is —O—, —S—, —SO$_2$—, —(C=O)—, -Aryl-, —O-Aryl-O— or —S-Aryl-S—, an optional chain-terminating agent, and an optional branching agent in a solvent to form a slurry;
heating the slurry to a temperature sufficient for the diamine and dianhydride to react and form a reaction mixture wherein the temperature is below the melting point of the dianhydride, below the melting point of the diamine, or below the melting points of the dianhydride and diamine; and
reacting the diamine and dianhydride to form a polyimide having sufficient molecular weight to precipitate from the reaction mixture,
wherein the diamine, the dianhydride, or both the diamine and the dianhydride are minimally soluble in the solvent and wherein the polyimide has a solubility of less than or equal to 10 weight percent in the solvent under the reaction conditions.

2. The process of claim 1 further comprising removing water from the reaction mixture.

3. The process of claim 1 further comprising keeping the temperature of the reaction mixture below the melting point of the dianhydride, below the melting point of the diamine, or below the melting point of the dianhydride and diamine until greater than or equal to about 50 mole % of the diamine, of the dianhydride or of the dianhydride and diamine is incorporated into the polyimide.

4. The process of claim 1 wherein the precipitated polyimide forms a uniform solid-liquid mixture.

5. The precipitated polyimide made by the process of claim 1 wherein the polyimide has greater than or equal to about 75 mole % imide linkages based on the total number of linkages in the polymer derived from reaction of a diamine with a dianhydride.

6. The process of claim 1 wherein the diamine, the dianhydride or both the diamine and the dianhydride have a melting point of about 100° C. to about 250° C.

7. The process of claim 1 wherein the diamine and dianhydride are present in the slurry in molar amounts differing by less than about 5 mole %.

8. The process of claim 1 wherein the dianhydride is selected from the group of dianhydride functional equivalents consisting of carboxylic acids, carboxylic esters, carboxylic acid esters, carboxylic anhydride esters, carboxylic anhydride acids, and mixtures comprising at least one of the foregoing wherein the dianhydride functional equivalent is capable of forming imide linkages by reaction with diamines.

9. The process of claim 1 wherein less than about 5 wt % of the solvent is soluble in water.

10. The process of claim 1 wherein the solvent has a boiling point greater than or equal to about 150° C. at atmospheric pressure.

11. The process of claim 1 wherein the solvent is selected from the group consisting of halogenated aromatics, alkyl aryl aromatics, aryl ethers, aryl aromatics, aryl sulfones, nitro aromatics, alkanes and mixtures comprising one or more of the foregoing solvents.

12. The process of claim 1 wherein the solvent has an auto ignition temperature greater than or equal to about 70° C.

13. The process of claim 1 wherein the solvent is essentially free of atoms selected from the group consisting of; nitrogen, sulfur or phosphorus.

14. The polyimide made by the process of claim 1 wherein the polyimide is a polyetherimide.

15. The polyimide made by the process of claim 1 wherein the polyimide is a polyetherimide sulfone.

16. The polyimide made by the process of claim 1 wherein at least about 50 mole % of the imide linkages are derived from the group consisting of oxydiphthalic anhydrides, oxydiphthalic acids, oxydiphthalic esters, and combinations comprising one or more of the foregoing.

17. The polyimide made by the process of claim 1 wherein at least about 50 mole % of the imide linkages are derived from diamino aryl sulfones.

18. The polyimide made by the process of claim 1 wherein the polyimide has melt viscosity, as measured by ASTM method D3835, at 350 to 425° C. of about 500 to 10,000 Pascal-seconds.

19. The polyimide produced by the process of claim 1 wherein the polyimide is essentially free of benzylic protons.

20. The polyimide produced by the process of claim 1 wherein the polyimide is essentially free of linkages derived from pyromellitic dianhydride.

21. The polyimide produced by the process of claim 1 wherein the polyimide is essentially free of halogen atoms.

22. The polyimide produced by the process of claim 1 wherein the polyimide has end groups selected from the group consisting of carboxylic acid anhydrides, carboxylic acids, carboxylic acid salts, amines, amides, ammonium salts and mixtures comprising one or more of the foregoing and further wherein the end groups are present in an amount of less than or equal to about 100 milliequivalents/Kg resin.

23. The process of claim 1 wherein the slurry further comprises about 0.1 to about 5.0 mole %, based on the total monomer content, of a mono-amine, mono-anhydride or combination thereof.

24. The process of claim 1 wherein the resultant polyimide has a glass transition temperature of about 250 to about 350° C.

25. The process of claim 1 further comprising isolating the precipitated polyimide from the slurry.

26. The process of claim 25 further comprising isolating the precipitated polyimide from the solvent by a technique selected from the group consisting of filtration, centrifugation, floatation, spray drying, solvent evaporation, solvent distillation and freeze drying, and combinations comprising one or more of the foregoing.

27. The process of claim 25 wherein the solvent is recovered and reused in a subsequent polymerization process of claim 1.

28. The process of claim 27 wherein the recovered solvent is reused directly without purification.

29. The polyimide produced by the process of claim 25 wherein greater than or equal to about 95 wt % of the isolated precipitated polyimide will pass through a 2 millimeter mesh screen.

30. The polyimide produced by the process of claim 25 wherein the polyimide is a free flowing powder with an average particle size of about 10 to about 5000 micrometers.

31. The process of claim 30 further comprising melt processing the isolated polyimide powder into pellets, profiles, fibers, films, tubes or wire coatings.

32. The process of claim 31 further comprising passing the molten polyimide through a filter having openings less than or equal to about 100 microns.

33. A process for preparing polyimide resins comprising:
stirring mixture consisting of a diamine of formula (X):

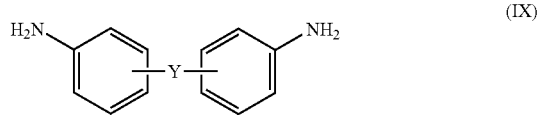

wherein Y is at least one of —O—, —S—, —SO$_2$—, —(C=O)—, -Aryl-, —O-Aryl-O— or —S-Aryl-S—, a dianhydride of formula (I):

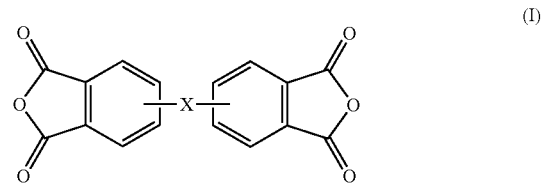

wherein X is —O—, —S—, —SO$_2$—, —(C=O)—, -Aryl-, —O-Aryl-O— or —S-Aryl-S—, 0.1 to about 5.0 mole %, based on the total monomer content of a chain-terminating agent, and an optional branching agent in a solvent to form a slurry;

heating the slurry to a temperature sufficient for the diamine and dianhydride to react and form a reaction mixture wherein the temperature is below the melting point of the dianhydride, below the melting point of the diamine, or below the melting points of the dianhydride and diamine;

reacting the diamine and dianhydride to form a polyimide having sufficient molecular weight to precipitate from the reaction mixture, and isolating the precipitated polyimide, wherein the diamine, the dianhydride, or both the diamine and the dianhydride are minimally soluble in the solvent, wherein the polyimide has a solubility of less than or equal to 10 weight percent in the solvent under the reaction conditions and is essentially free of benzylic protons and halogen atoms, wherein the solvent is selected from the group consisting of halogenated aromatics, alkyl aryl aromatics, aryl ethers, aryl aromatics, aryl sulfones, nitro aromatics, alkanes and mixtures comprising one or more of the foregoing solvents, less than about 5 wt % of the solvent is soluble in water, and wherein the isolated polyimide is a free flowing powder with an average particle size of about 10 to about 5000 micrometers.

* * * * *